(12) United States Patent
Heidenreich

(10) Patent No.: US 9,090,006 B2
(45) Date of Patent: Jul. 28, 2015

(54) DAMPING ELEMENT WITH CONNECTING SUBSTANCE

(75) Inventor: Holger Heidenreich, Wetschen (DE)

(73) Assignee: BASF SE, Ludwigshafen (DE)

(*) Notice: Subject to any disclaimer, the term of this patent is extended or adjusted under 35 U.S.C. 154(b) by 235 days.

(21) Appl. No.: 13/096,261

(22) Filed: Apr. 28, 2011

(65) Prior Publication Data

US 2011/0266729 A1 Nov. 3, 2011

Related U.S. Application Data

(60) Provisional application No. 61/329,145, filed on Apr. 29, 2010.

(51) Int. Cl.
| | |
|---|---|
| B29C 45/14 | (2006.01) |
| B29C 44/12 | (2006.01) |
| F16F 1/37 | (2006.01) |
| F16F 1/44 | (2006.01) |
| F16F 3/087 | (2006.01) |

(52) U.S. Cl.
CPC .............. *B29C 44/1285* (2013.01); *F16F 1/37* (2013.01); *F16F 1/44* (2013.01); *F16F 3/0876* (2013.01); *F16F 2230/0005* (2013.01)

(58) Field of Classification Search
USPC ........... 267/136, 140.11, 140.13, 140.3, 141, 267/153, 292; 264/153, 279, 275, 277
See application file for complete search history.

(56) References Cited

U.S. PATENT DOCUMENTS

| | | | | |
|---|---|---|---|---|
| 2,241,026 | A | | 5/1941 | Wylie |
| 2,969,656 | A | * | 1/1961 | Reuter .......................... 267/292 |
| 3,157,934 | A | * | 11/1964 | Williams ...................... 267/292 |
| 4,132,825 | A | * | 1/1979 | Hahn ............................ 267/137 |
| 4,477,405 | A | * | 10/1984 | Makhlouf et al. ............ 264/279 |
| 4,826,944 | A | * | 5/1989 | Hoefer et al. ................... 528/49 |
| 6,375,879 | B1 | * | 4/2002 | Horiuchi ....................... 264/153 |
| 2002/0074701 | A1 | * | 6/2002 | Detzner ........................ 267/141 |
| 2004/0178549 | A1 | | 9/2004 | Hjerth et al. |
| 2009/0065990 | A1 | | 3/2009 | Hjerth et al. |

FOREIGN PATENT DOCUMENTS

| | | |
|---|---|---|
| DE | 687 721 | 6/1940 |
| DE | 1 792 803 U | 7/1959 |
| DE | 1 830 236 U | 4/1961 |
| DE | 974 960 | 6/1961 |
| DE | 1 848 787 U | 3/1962 |
| DE | 75 12 822 | 11/1975 |
| DE | 27 37 961 A1 | 3/1978 |
| DE | 195 48 770 A1 | 6/1997 |
| DE | 195 48 771 A1 | 6/1997 |

(Continued)

OTHER PUBLICATIONS

German Office Action issued Jul. 18, 2012, in Patent Application No. 10 2010 028 391.6 (with English-language translation).

(Continued)

*Primary Examiner* — Thomas J Williams

(74) *Attorney, Agent, or Firm* — Oblon, McClelland, Maier & Neustadt, L.L.P.

(57) ABSTRACT

A damping element is provided having at least one fastener and a spring element on the basis of cellular polyisocyanate polyaddition products which are firmly connected to each other, and a method for producing the same, and uses of the same.

4 Claims, 2 Drawing Sheets

(56) References Cited

FOREIGN PATENT DOCUMENTS

| | | |
|---|---|---|
| DE | 10 2004 009 252 A1 | 9/2005 |
| EP | 0 036 994 A2 | 10/1981 |
| EP | 0 062 835 A1 | 10/1982 |
| EP | 0 092 672 A2 | 11/1983 |
| EP | 0 092 672 A3 | 11/1983 |
| EP | 0 250 969 A1 | 1/1988 |
| EP | 1 171 515 | 1/2002 |
| GB | 1 061 930 | 3/1967 |
| GB | 1 568 119 | 5/1980 |
| GB | 2 117 085 A | 10/1983 |
| WO | WO 00/63279 | 10/2000 |
| WO | WO 03/041975 A1 | 5/2003 |

OTHER PUBLICATIONS

International Search Report issued Sep. 6, 2012 in German Patent Application No. PCT/EP2011/056729 (with English translation of category of cited documents).

* cited by examiner

DAMPING ELEMENT WITH CONNECTING SUBSTANCE

The present application incorporates provisional U.S. application 61/329,145, filed on Apr. 29, 2010, by reference.

The present invention relates to a damping element comprising at least one fastening means and a spring element on the basis of cellular polyisocyanate polyaddition products which are firmly connected to each other. Furthermore, the invention relates to a method for producing damping elements of this type and to the use thereof.

Damping elements in which a fastening means and a spring element are firmly connected to each other are known, and are described in the German standard DIN 95364. Used there as fastening means are components of metal which have an internal thread or an external thread. They are provided with a thin, usually circular, support, onto which the spring element of rubber is vulcanized to produce the damping element. The properties of damping elements of this type are determined by the rubber mixture and are subject to the known limitations, for example with regard to the hardness of the rubber. Usually, the hardness of the rubber mixtures ranges from Shore 45 A to Shore 65 A, in individual cases even down to Shore 40 A. However, there is then the risk of the added plasticizers escaping over time and the material becoming brittle and consequently harder. Lower hardnesses can scarcely be produced, greater spring deflections can only be achieved by building up the rubber elements to a greater height. This in turn leads to poorer guidance of the units to be supported because of lateral instability.

Furthermore, there are known damping elements of which the spring element is produced from a cellular elastic material and can be fastened to a further component by fastening means. Utility model DE 7512822 U describes a damping element of this type, which has a bearing plate with openings and webs, onto which the spring element is foamed. Although this construction has improved damping properties in comparison with rubber-based damping elements, it has the disadvantage of a complex construction and minimum volumes for filling the openings with foam.

It was an object of the present invention to provide a damping element which has improved damping properties in comparison with rubber-based components, is of a simple construction and can be produced at low cost.

BRIEF DESCRIPTION OF THE FIGURES

Various other objects, features and attendant advantages of the present invention will be more fully appreciated as the same becomes better understood from the following detailed description when considered in connection with the accompanying drawings in which like reference characters designate like or corresponding parts throughout the several views and wherein.

Figure 1:
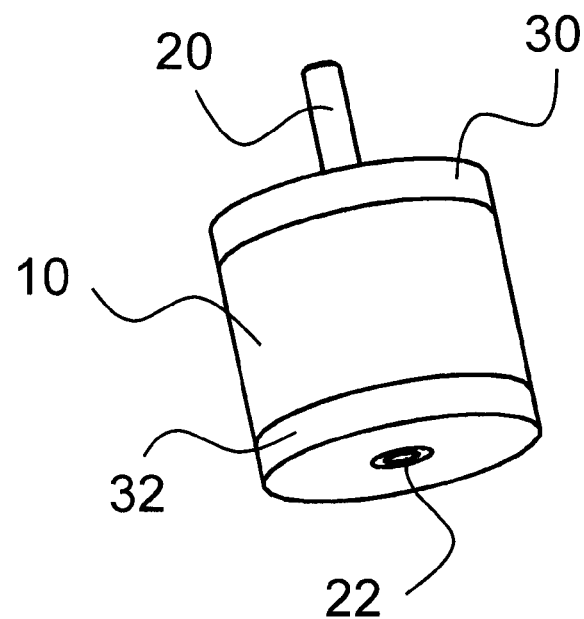
FIG. 1 shows a three-dimensional view of a damping element according to the invention with a spring element 10, a first fastening means 20, a second fastening means 22 as well as a first layer of connecting means 30 and a second layer of connecting means 32.

A damping element according to the invention comprises at least one fastening means and at least one spring element on the basis of cellular polyisocyanate polyaddition products. Components with or without a thread may be used as the fastening means, such as screws, nuts, pins or bolts. Standard or standardized components are preferably used. In the case of screws and nuts, those which have a square, hexagonal or octagonal outer contour, in particular a hexagonal outer contour, are particularly preferred. The fastening means may be produced from hard plastic such as polyamide. They may also be produced from metals such as steel or high-grade steel, with or without a coating.

A cellular polyisocyanate polyaddition product is used according to the invention as the spring element. Cellular means in this context that the cells preferably have a diameter of from 0.01 mm to 0.5 mm, particularly preferably from 0.1 mm to 0.15 mm. Elastomers on the basis of cellular polyisocyanate polyaddition products and the preparation thereof are generally known and have been variously described, for example in EP 62 835 A1, EP 36 994 A2, EP 250 969 A1, EP 1 171 515 A1, DE 195 48 770 A1 and DE 195 48 771 A1.

The fastening means and the spring element are firmly connected to each other by connecting means. Connecting means are advantageously selected from the group comprising casting resins, compact polyurethane systems or expanded polyurethane systems. Examples of connecting means are compact casting resins, rigid integral systems, thermoset systems and elastomer systems. Polyurethane systems of this type are sold, for example, under the trade names Elasturan, Elastocoat C, Elastolit D and Elastolit K. A connecting means may also comprise a number of elements of the aforementioned groups.

The connecting means may also be systems which are fiber-reinforced, for example with glass fibers or carbon fibers, or comprise fillers. The customary organic and inorganic fillers, reinforcing agents, weighting agents, means for improving the abrasion characteristics and the like known per se are preferably used as fillers. The following may be specifically mentioned by way of example: inorganic fillers such as silicate minerals, for example phyllosilicates, such as antigorite, serpentine, hornblendes, amphiboles, chrysotile and talc; metal oxides such as kaolin, aluminum oxides, titanium oxides and iron oxides; metal salts such as chalk and barite and inorganic pigments such as cadmium sulfide, zinc sulfide and glass. Preferably used are kaolin (china clay), aluminum silicate and coprecipitates of barium sulfide and aluminum silicate as well as natural and synthetic fibrous minerals such as wollastonite, metal fibers and, in particular, glass fibers of various lengths, which may or may not be sized. Examples of possible organic fillers are: carbon black, melamine, colophony, cyclopentadienyl resins and graft polymers as well as cellulose fibers, polyamide fibers, polyacrylonitrile fibers, polyurethane fibers and polyester fibers on the basis of aromatic and/or aliphatic dicarboxylic esters and, in particular, carbon fibers.

The inorganic and organic fillers may be used individually or as mixtures and are preferably comprised in the composite material in amounts of from 0.5 to 50% by weight, particularly preferably from 1 to 40% by weight, with reference to the weight of the polyurethanes and the filler.

The spring element and the connecting means are preferably chosen such that, on account of their material properties, they enter into a very strong chemical bond and are connected by material interlocking. The connection between the fastening means and the connecting means is preferably based on a form fit, in that the connecting means surrounds part of the fastening means. The fastening means and the connecting means may also alternatively or additionally be connected to each other by material interlocking, for example by the surface of the fastening means being treated with an adhesion promoter before it is brought into contact with the connecting means.

In a preferred variant of the invention, the damping element has two fastening means which are arranged on opposite sides of the spring element. The fastening means may be of the same type, for example two screws or two nuts, but they may also be of different types, for example a screw on one side and a nut on the other side. The two fastening means may be of the same size or have the same thread diameter, but they may also be of different sizes or have different thread diameters.

In a further preferred embodiment, the damping element comprises two or more fastening means which are arranged on the same side of the spring element. An arrangement of this type is of advantage in particular whenever the supporting surface of the damping element is extended in one or more spatial directions. An example is an elongate damping element which has a fastening means in the vicinity of each of the furthest away ends.

In one embodiment according to the invention, the fastening means has a head of which the outside diameter is preferably from 5.5 mm (M3) to 46 mm (M30), particularly preferably from 5.5 mm (M3) to 24 mm (M16), in particular from 7 mm (M4) to 17 mm (M10). The outside diameter should be understood here as meaning the width across flats, which corresponds to the distance between two opposite sides of a square, hexagonal or octagonal profile. The fastening means may exclusively comprise the head, as in the case of a nut, which represents a head with an internal thread. However, the fastening means may also have other component parts, as in the case of a screw, on which the head is adjoined by a shank, which for its part is provided with an external thread. The values given above in parentheses relate to the nominal diameters of the threads for the respective width across flats, for example the nominal diameter M3 for the width across flats 5.5 mm. The head preferably has a height of from 2 mm to 19 mm, particularly preferably from 2 mm to 10 mm, in particular from 2.5 mm to 7 mm. The preferred value ranges for the height of the head also apply to fastening means such as bolts or pins which have no definite head. In the case of such fastening means, an end of the fastening means is understood as being the head for the purposes of the invention.

The spring element may correspond in its outer form to the form of the surface of the fastening means on which it is fastened, for example a hexagonal form in the case of a nut or screw. The outside diameter of the spring element is preferably greater than that of the fastening means. In the case of a non-circular cross section, the outside diameter of the spring element should be understood as meaning the greatest distance between two parallel sides, for example of a rectangle, square, hexagon or octagon. The outside diameter of the spring element is preferably from 6.5 mm to 70 mm, particularly preferably from 10 mm to 60 mm, in particular from 10 mm to 50 mm. The height of the spring element is preferably from 3 mm to 60 mm, particularly preferably from 5 mm to 50 mm, in particular from 10 mm to 40 mm.

According to the invention, a connecting means establishes a firm connection between a fastening means and a spring element. In a preferred embodiment, the outside diameter of the spring element is greater than the outside diameter of at least one fastening means. The connecting means is applied to the spring element with a height such that it at least partially encloses the head of the fastening means peripherally. The height to which the head is peripherally enclosed depends on the loads to be expected that the damping element is intended to withstand. If, for example, the damping element is loaded predominantly perpendicularly to the supporting surface of the fastening means and the spring element, lateral retention, that is to say peripheral retention, is of secondary importance. If, on the other hand, loading parallel to the supporting surface between the fastening means and the spring element can also be expected, the head of the fastening means should be adequately supported peripherally by connecting means. The head of the fastening means is preferably peripherally enclosed from 0.1 mm to 10 mm, particularly preferably from 0.5 mm to 5 mm, in particular from 1 mm to 3 mm.

Particularly preferably, the connecting means applied to the spring element peripherally encloses the head of the at least one fastening means completely and rises up above it to a height of from 0 mm to 10 mm, more preferably from 0 mm to 5 mm, in particular from 0 mm to 3 mm, directed away from the spring element. A value of 0 mm means that the end face of the head forms a planar surface with the connecting means. This embodiment is advantageous in particular in the case of nuts as fastening means. A value greater than zero means that, in the case of a nut as fastening means, the end face of the nut lies below the surface of the connecting means. In the case of a screw, a value greater than zero means that the shank of the screw is also partially enclosed by the connecting means. In the case of an embodiment in which the head of the fastening means is peripherally enclosed completely, the solidified connecting means forms a supporting surface, which has advantages in particular whenever the damping element is intended to lie in contact over its full surface area after it is fastened to a component or unit to be damped.

In a further preferred embodiment, between the spring element and the fastening means there is a layer of connecting means, the height of which is preferably from 0.1 mm to 10 mm, particularly preferably from 0.5 mm to 5 mm, in particular from 1 mm to 3 mm. This embodiment is advantageous when the outside diameter of the spring element is less than or equal to the outside diameter of the fastening means, since in such a case the head of the fastening means cannot be peripherally enclosed.

Furthermore, this embodiment has advantages when the damping element is exposed to compressive loads perpendicularly to the supporting surface of the fastening means and the spring element. In this case, the layer of connecting means reduces or prevents the head of the fastening means from pressing into the spring element. The height of the layer of connecting means between the spring element and the fastening means and the type of connecting means are advantageously chosen such that they withstand the compressive loads to be expected.

Also preferred is an embodiment in which not only is there a layer of connecting means between the spring element and the fastening means but also the head of the fastening means is at least partially enclosed peripherally. In this case, the height of the layer of connecting means between the spring element and the fastening means is preferably from 0.1 mm to 10 mm, particularly preferably from 0.5 mm to 5 mm, in particular from 1 mm to 3 mm, and the head of the fastening means is peripherally enclosed preferably from 0.1 mm to 10 mm, particularly preferably from 0.5 mm to 5 mm, in particular from 1 mm to 3 mm. More preferably, the head of the at least one fastening means peripherally encloses the connecting means applied to the spring element completely and rises up above it to a height of from 0 mm to 10 mm, more preferably from 0 mm to 5 mm, in particular from 0 mm to 3 mm. The total layer thickness of the connecting means applied to the spring element is in this case preferably from 2 mm to 20 mm, particularly preferably from 2 mm to 11 mm, in particular from 2.8 mm to 8 mm.

In the case of an embodiment with two fastening means on opposite sides of the spring element, the fastening means may be connected to the spring element in the same way. However, they may also be connected to the spring element in different ways, for example one fastening means in contact with the spring element and the other via a layer of connecting means between the spring element and the fastening means.

To produce the damping elements according to the invention, first the spring elements are provided. Methods for producing spring elements on the basis of cellular polyisocyanate polyaddition products are known.

The cellular polyisocyanate polyaddition products preferably have at least one of the following material properties: a density to DIN EN ISO 845 of between 200 and 1100 kg/m$^3$, preferably between 270 and 900 kg/m$^3$, a tensile strength to DIN EN ISO 1798 of ≥2.0 N/mm$^2$, preferably >4 N/mm$^2$, particularly preferably between 2 and 8 N/mm$^2$, an elongation at break to DIN EN ISO 1798 of ≥200%, preferably ≥230%, particularly preferably between 300 and 700%, and/or a tear propagation resistance to DIN ISO 34-1 B (b) of ≥6 N/mm, particularly preferably 8 N/mm. In further preferred embodiments, the cellular polyisocyanate polyaddition product has two, more preferably three, of these material properties; particularly preferred embodiments have all four of the material properties mentioned.

They are usually prepared by reacting isocyanates with compounds that are reactive to isocyanates.

In a preferred embodiment, the cellular polyurethane elastomers are prepared on the basis of the isocyanates toluene diisocyanate (TDI) and naphthylene diisocyanate (NDI), most particularly preferably on the basis of 2,6-toluene diisocyanate (TODI) and 1,5-naphthylene diisocyanate (5-NDI).

The spring elements on the basis of cellular polyisocyanate polyaddition products are usually produced in a mold in which the reactive starting components are reacted with one another. Conventional molds, for example metal molds, which by their form ensure the three-dimensional form of the spring element, usually come into consideration here as molds.

The preparation of the polyisocyanate polyaddition products may take place on the basis of generally known methods, for example by using the following starting materials in a one-stage or two-stage process:
(a) isocyanate,
(b) compounds reactive to isocyanates,
(c) water and optionally
(d) catalysts,
(e) foaming agents and/or
(f) auxiliaries and/or additives, for example polysiloxanes and/or fatty acid sulfonates.

The surface temperature of the inner wall of the mold is usually 40° C. to 95° C., preferably 50° to 90° C.

The production of the molded parts is advantageously carried out using an NCO/OH ratio of from 0.85 to 1.20, the heated starting components being mixed and introduced into a heated, preferably tightly closing mold in an amount corresponding to the desired density of the molded part.

The molded parts are cured, and consequently can be demolded, after up to 60 minutes.

The amount of reaction mixture introduced into the mold is usually set such that the moldings obtained have the density already described.

The starting components are usually introduced into the mold at a temperature of from 15 to 120° C., preferably from 30 to 110° C. The degrees of compaction for producing the moldings lie between 1.1 and 8, preferably between 2 and 6.

The cellular polyisocyanate polyaddition products are expediently produced by the one-shot method using the low-pressure technique or, in particular, the reaction injection-molding technique (RIM) in open or preferably closed molds. The reaction is carried out in particular with compaction in a closed mold. The reaction injection-molding technique is described, for example, by H. Piechota and H. Rohr in "Integralschaumstoffe" [integral foams], Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76-84.

Spring elements may also be made up of a number of layers of part spring elements of the same or different densities, which are connected to one another by material interlocking, for example by adhesive bonding with one of the aforementioned connecting means.

In a preferred embodiment, a spring element is provided in the dimensions in which it will be fitted in the damping element and is placed in a casting mold. A fastening means is positioned on the spring element or at a distance vertically away from the spring element. A connecting means is applied to the spring element in the desired amount, so that a durable connection is produced between the spring element and the fastening means. The amount is advantageously set such that the head of the fastening means is at least partially enclosed by the connecting means in the vertical direction. After curing of the connecting means, the damping element is removed from the casting mold.

The damping elements can in this way be produced singly, which is suitable in particular for special parts. For standard parts, it is usually advantageous from economic points of view to produce a large quantity of damping elements simultaneously. For this purpose, the production apparatuses may be equipped in such a way that many damping elements can be produced in parallel in corresponding casting molds.

In a further preferred embodiment, the production costs can be further lowered by not producing the spring elements individually but as a spring element sheet. The height of the sheet in this case corresponds to the height of the spring element to be used in the damping element. Typical lengths and widths of the sheet are 1000 mm×250 mm, 750 mm×500 mm or 500 mm×250 mm. With conventional mixing heads, volumes up to approximately 40 l can be foam-filled without any problem.

In the case of this method according to the invention, a spring element sheet is placed in a casting mold. A number of fastening means are positioned on the sheet or at a distance vertically away from the sheet, for example in a frame which is held above the sheet. A connecting means is applied to the sheet in the desired amount, so that a permanent connection is produced between the spring element sheet and the fastening means. The amount is advantageously set such that the head of the fastening means is at least partially enclosed by the connecting means in the vertical direction. After curing of the connecting means, the damping elements are obtained by being cut out of the sheet in the desired form. Suitable cutting methods are known to a person skilled in the art. An advantageous cutting method is in this case that of water jet cutting.

In a further preferred embodiment of the production method according to the invention, a spring element sheet is placed in a casting mold. Subsequently, a connecting means is applied to the sheet in an amount such that the layer thickness of the connecting means in the vertical direction is preferably from 2 mm to 20 mm, particularly preferably from 2 mm to 11 mm, in particular from 2.8 mm to 8 mm. A number of fastening means are positioned in the still liquid connecting means in such a way that their heads are at least partially enclosed by the connecting means in the vertical direction. After curing of the connecting means, the damping elements are obtained by cutting out from the sheet as described above.

A further refinement according to the invention concerns damping elements which have fastening means on both sides of the spring element. To produce them, the procedure described above is initially followed, so that a fastening means is firmly connected to one side of the spring element. Subsequently, the half-completed damping element is removed from the casting mold and, after being inverted in the vertical direction, is placed in the same or a different casting mold, in order that the method steps already described above of positioning the fastening means, filling with molten connecting means as well as curing and removing from the casting mold can then be carried out.

If the damping elements are produced from a spring element sheet, the sheet is advantageously first provided with, and connected to, fastening means on one side, then, after curing of the connecting means, the sheet is removed from the casting mold and, after being inverted in the vertical direction, is placed in the same or a different casting mold. After that, the same method steps of positioning the fastening means, filling with molten connecting means as well as curing the connecting means are carried out as described above. Finally, the damping elements provided with fastening means on both sides are obtained by cutting out from the sheet.

The method according to the invention in its various refinements can be advantageously automated, whereby the damping elements can be produced at low cost.

The type of connection of the spring element and the fastening means according to the invention brings about the effect that the friction between the spring element and the fastening means is significantly reduced or entirely avoided, which has advantageous effects on the service life and leads to lower dynamic stiffening of the damping elements. The embodiment with a completely enclosed head has the additional advantage that the fastening means is to the greatest extent protected in the installed state from harmful environmental influences such as corrosion.

In comparison with conventional rubber-metal elements, lower stiffnesses can be achieved with damping elements according to the invention. This allows units with a lower weight, for example from 100 grams, also to be effectively decoupled. The decidedly progressive spring characteristic counteracts disproportionate deflections of the unit to be supported. When the damping elements according to the invention are used in an automobile, comfort can be improved by reducing vibrations and noises, or on roads where the surface is poor the permissible deflections of the unit to be supported can be reduced. Moreover, the spring deflecting rates of the cellular polyisocyanate polyaddition product, higher than those of rubber, allow smaller overall heights of the damping elements to be realized, thereby opening up new design possibilities with respect to the installation space.

The damping elements according to the invention can be advantageously used for mounting units and components in vehicles and industrial applications, for example units which cause vibrations or noises on account of translatory or rotational movements, such as pumps, turbines, internal combustion engines, electric motors, compressors, blowers, fans or transmissions. An example is the mounting of fans in vehicles, another is the mounting of a compressor in a refrigerator. Units of this type may, for example, be fixed on three or four damping elements by means of screws and/or nuts on the unit and on the fastening surface.

Furthermore, vibration-sensitive components can be advantageously mounted by means of the damping elements according to the invention in order to protect them from shocks or vibrations. An example of this is the mounting of sensitive electronic components such as ABS or EPS in an automobile.

The damping elements may also assume the function of a stop buffer or a straightforward spring element.

EXAMPLE

FIG. 1 shows a three-dimensional view of a damping element according to the invention with a spring element 10, a first fastening means 20, a second fastening means 22 as well as a first layer of connecting means 30 and a second layer of connecting means 32. The damping element has a circular cross section and is rotationally symmetrical in relation to its longitudinal axis.

Figure 2:
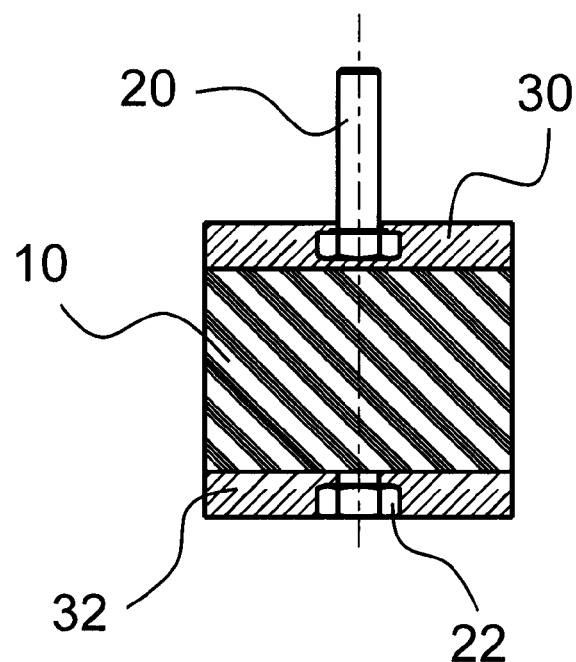
FIG. 2 represents a longitudinal section, to scale, through the damping element, the diameter of the spring element being 30 mm and its height 20 mm.

FIG. 2 represents a longitudinal section, to scale, through the damping element, the diameter of the spring element being 30 mm and its height 20 mm. A commercially available hexagon screw is used as the first fastening means 20. Between the spring element 10 and the head of the screw 20 there is a layer of connecting means, in order to reduce pressing of the head into the spring element when there is axial pressure on the damping element. The connecting means peripherally encloses the head of the screw 20 completely and rises up above it, so that part of the screw shank is also enclosed by connecting means. On the side of the spring element 10 opposite from the screw 20 there is a commercially available hexagon nut as the second fastening means 22. Also between the spring element 10 and the nut 22 there is a layer of connecting means, in order to reduce pressing in of the head when there is axial compressive loading. The connecting means 32 is applied on this side to a height such that the head of the second fastening means 22 is peripherally enclosed completely, but the connecting means does not rise up above the head.

The surfaces of the layers of connecting means that are facing axially away from the spring element 10 respectively form a planar supporting surface, with which the damping element is in contact over its full surface area after fastening to a component or unit to be damped. The damping element represented is particularly suitable for vibration decoupling between two components for which an external thread and an internal thread are required to fasten them.

Figure 3:
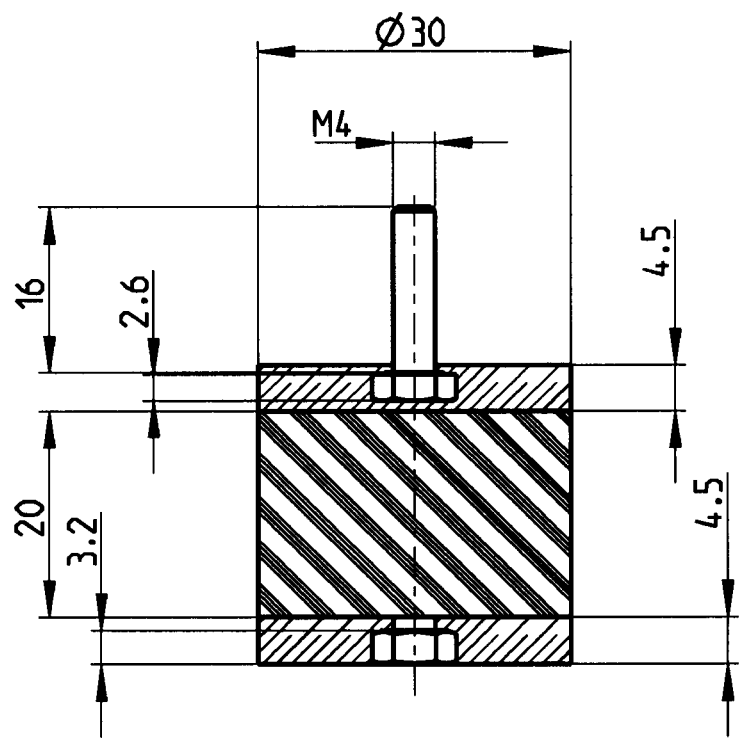
FIG. 3 shows the same longitudinal section through the damping element as FIG. 2, but with dimensions indicated in millimeters.

FIG. 3 shows the same longitudinal section through the damping element as FIG. 2, but with dimensions indicated in millimeters. The first fastening element is a screw to DIN 934 M4×16, the second fastening element is a nut to DIN 934 M4. The thickness of the layer of connecting means between the screw head and the spring element is 1 mm, the shank of the screw is enclosed by the connecting means to a height of 0.9 mm. The thickness of the layer of connecting means between the nut and the spring element is in this example 1.3 mm.

The invention claimed is:

1. A method for producing a damping element, wherein the damping element comprises at least one fastening means and a spring element on the basis of cellular polyisocyanate polyaddition products, wherein
(a) a spring element sheet is placed in a casting mold,
(b) the at least one fastening means each having a head is positioned on the sheet or at a distance vertically away from the sheet,
(c) an uncured connecting means is applied in molten form to the sheet in an amount such that the heads of the fastening means are at least partially enclosed by the uncured connecting means in the vertical direction,
(c') curing the uncured connecting means to provide the connecting means, and
(d) obtaining the damping element by cutting out from the sheet.

2. A method for producing a damping element, wherein the damping element comprises at least one fastening means and a spring element on the basis of cellular polyisocyanate polyaddition products, wherein
  (a) a spring element sheet is placed in a casting mold,
  (b) an uncured connecting means is applied in molten form to the sheet in an amount such that a layer thickness of the uncured molten connecting means in the vertical direction is from 2 mm to 20 mm,
  (c) the at least one fastening means is positioned in a still liquid uncured connecting means in such a way that a head of the at least one fastening means is at least partially enclosed by the uncured connecting means in the vertical direction,
  (c') curing the uncured connecting means to provide the connecting means, and
  (d) obtaining the damping element by cutting out from the sheet.

3. A method for producing a damping element, wherein the damping element comprises two fastening means and a spring element on the basis of cellular polyisocyanate polyaddition products, wherein first the method steps (a) to (c) according to claim 1 or 2 are carried out, then, after curing of the uncured connecting means, the half-completed damping elements or the sheet is removed from the casting mold, after being inverted is placed in the same or a different casting mold, and the method steps (b) to (d) are carried out.

4. A method for producing a damping element according to claim 1 or 2, the connecting means comprising one or more elements selected from the group consisting of casting resins, compact polyurethane systems, expanded polyurethane systems and fiber-reinforced polyurethane systems.

* * * * *